Patented May 14, 1929.

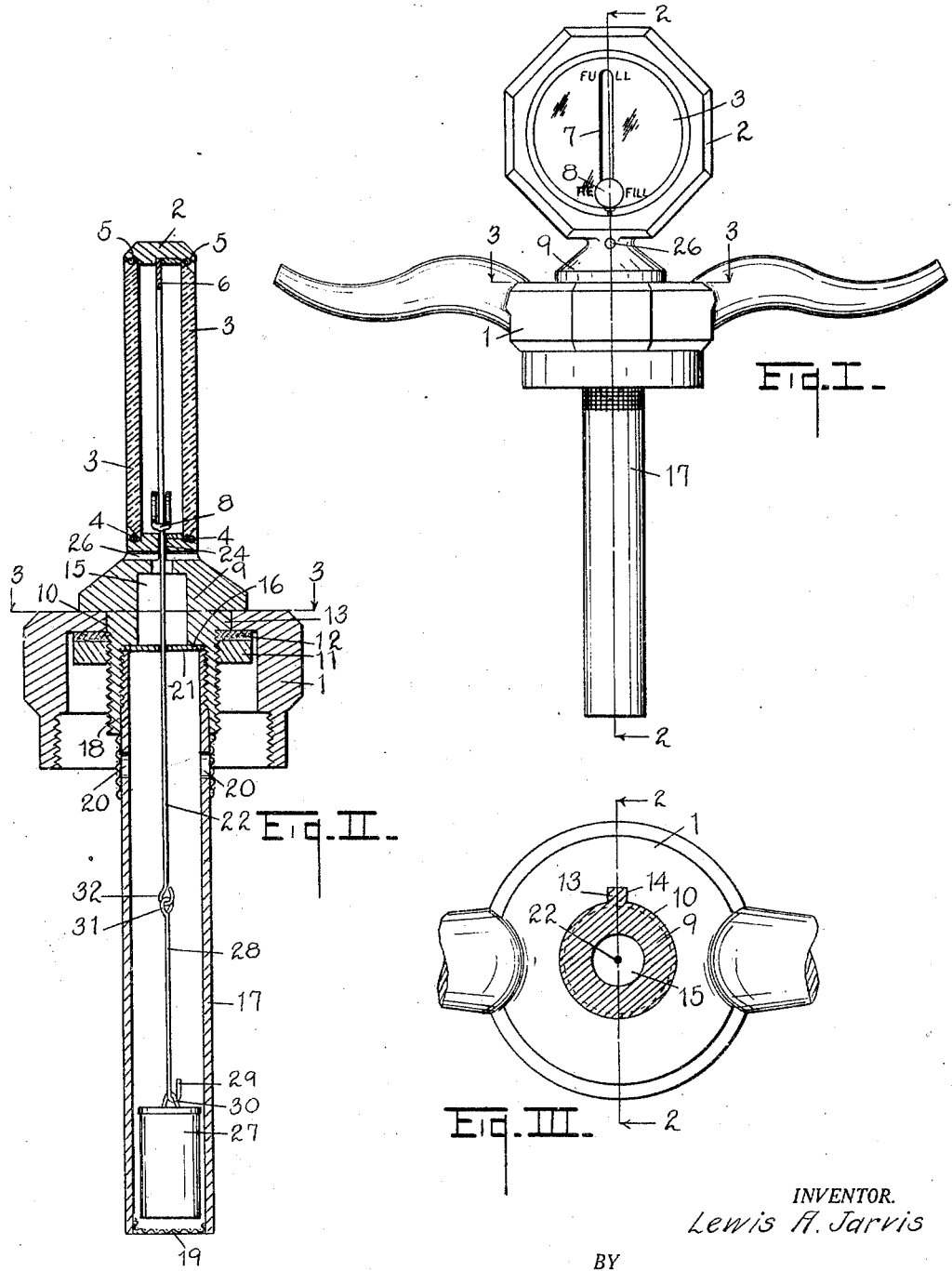

1,712,794

UNITED STATES PATENT OFFICE.

LEWIS A. JARVIS, OF GRAND RAPIDS, MICHIGAN.

WATER GAUGE.

Application filed July 3, 1923. Serial No. 649,227.

This invention relates to improvements in water gauges.

My improved water gauge is particularly designed by me for indicating the level of water and the condition of the water and cooling liquid in the radiator of an automobile and is illustrated specifically as embodied in that connection.

The main objects of the invention are:

First, to provide an improved gauge for use on automobiles which is visible for considerable distances.

Second, to provide an improved gauge structure in which the parts are so constructed and arranged that the moving parts are not likely to become clogged or inoperative.

Third, to provide an improved gauge in which the parts are simple and economical in structure and readily assembled, the parts when assembled being very strong and durable although of comparatively light weight.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this application, in which:

Fig. I is a side elevation of my improved gauge as embodied for radiators.

Fig. II is a vertical section on a line corresponding to line 2—2 of Figs. I and III.

Fig. III is a detail horizontal section on a line corresponding to line 3—3 of Fig. II.

In the drawing similar reference characters refer to similar parts throughout the several views, and the sectional views are taken looking in the direction of the little arrows at the ends of the section lines.

Referring to the drawing, 1 represents a radiator cap internally threaded to engage the neck of the radiator, although it will be understood that certain radiator necks are internally threaded, in which case the cap is modified accordingly.

I provide a dial which, in the structure illustrated, comprises a frame-like body 2 having windows 3 disposed at the front and rear thereof providing a closed case. These windows or panes are retained by the split rings 4 seated in the grooves 5. The enclosed dial plate 6 is provided with a vertical slot 7 which constitutes a guide for the vane or indicator 8.

The frame-like body 2 has an integral shank 9 which is disposed through a hole 10 in the top of the radiator cap 1. This shank is externally threaded to receive the clamping nut 11 disposed within the cap, a gasket 12 being interposed between the nut and a cap to seal the joint. The shank is provided with a lug 13 engaging a notch 14 in one side of the hole 10 thereby positioning the dial and preventing the turning of the dial within the cap. The shank has an internal chamber 15 shouldered at 16 and internally threaded as illustrated to receive the threaded end of the tubular cylindrical float housing member 17. The shank has an unthreaded portion 18 below its threads, this unthreaded portion being adapted to embrace and laterally support the housing when it is threaded into the shank. The housing is ordinarily formed of a piece of drawn tubing and the threads materially weaken the same, so that where the threads terminate at the end of the shank breakage may occur. By having this unthreaded portion in the shank embracing the rods to laterally support it an effective connection is provided and at the same time one which is not likely to become broken. The housing has a screen 19 at its lower end and side vents 20 adjacent its upper end, these side vents being also screened. A disk 21 constituting a guide for the indicator rod 22 is clamped between the shoulder 16 of the shank and the end of the housing 17. The rod is thus guided and laterally supported by this guiding disk 21 and the bore 24 in the upper end of the shank. The indicator 8 is mounted upon the upper end of this rod. Vents 26 to the atmosphere open into the bore 24.

The float 27 is preferably in the form of a cylinder as illustrated, it being of such dimensions relative to the housing 16 that its upright position is maintained thereby and at the same time a limited lateral movement is prevented such as might be occasioned by the swinging or jolting of the vehicle. This float is connected to the rod 22 by the link 28, the link having a hook 29 at its lower end engaging the eye 30 in the upper end of the float and an eye 31 at its upper end engaging an eye 32 in the lower end of the rod 22.

The bill of the hook 29 is of such length that it cannot become disengaged while the float is maintained in an upright position within the guide housing. It, however, can be readily engaged and disengaged when the housing is removed. This connection for the link permits freedom of movement of the float in any direction without imparting a clutch action to the indicator rod so that the indicator rod moves freely under varying conditions and at the same time the indicator is caused to move by the ordinary motion of a motor vehicle.

I have illustrated and described my improvements in a form which is very efficient. I have not attempted to illustrate or describe certain modifications or adaptations which I contemplate as I believe the disclosure made will enable those skilled in the art to which my invention relates to embody or adapt the same as may be desired.

Having thus described my invention, what I claim as new and desire to secure by Letters Patent, is:

1. In a gauge, the combination of a dial case having a window at the front and rear thereof, a hollow shank for said dial casing opening thereto and having a vent opening, a dial in said case, a cylindrical tubular float housing secured to said shank, an indicator rod guided for vertical movement in said shank and provided with an indicator operatively associated with said dial, a cylindrical float disposed in said housing, said housing and float being of such relative dimensions that the housing constitutes a guide for the float supporting it in upright position while permitting limited lateral movement thereof, said float having an eye on its upper end, and a link having a hook engaged in said eye, said link and rod having co-engaging eyes, the bill of the hook being of such length as to prevent disengaging of the hook while the float is within the housing.

2. In a gauge, the combination of a dial case having a window at the front and rear thereof, a hollow shank for said dial casing opening thereto and having a vent opening, a dial in said case, a cylindrical tubular float housing depending from said shank, an indicator rod guided for vertical movement in said shank and provided with an indicator operatively associated with said dial, a cylindrical float disposed in said housing, said housing and float being of such relative dimensions that the housing constitutes a guide for the float supporting it in upright position while permitting limited lateral movement thereof, and a link connecting said float to said rod.

3. In a gauge, the combination of a dial, a supporting shank for said dial, a float housing depending from said shank, an indicator rod mounted for vertical movement in said shank and having an indicator operatively associated with said dial, a float disposed in said housing, said housing and float being of such relative dimensions that the housing constitutes a guide for the float supporting it in upright position while permitting limited lateral movement thereof, said float having an eye on its upper end, and a link having a hook engaged in said eye, said link and rod having co-engaging eyes, the bill of the hook being of such length as to prevent disengagement of the hook while the float is within the housing.

4. In a gauge, the combination of a dial, a supporting shank for said dial, a float housing depending from said shank, an indicator rod mounted for vertical movement in said shank and having an indicator operatively associated with said dial, a float disposed in said housing, said housing and float being of such relative dimensions that the housing constitutes a guide for the float supporting it in upright position while permitting limited lateral movement thereof, and a link connecting said float to said rod.

5. In a gauge, the combination of a vertically slotted dial, a supporting shank for said dial, a float housing depending from said shank, an indicator rod mounted for vertical movement in said shank and having an indicator reciprocating in said slot, a float disposed in said housing, and a link connecting said float to said rod.

6. In a gauge, the combination of a dial, a supporting shank for said dial, a float housing depending from said shank, an indicator rod mounted for vertical movement in said shank and having an indicator operatively associated with said dial, a float disposed in said housing, said housing and float being of such relative dimensions that the housing constitutes a guide for the float while permitting limited lateral movement thereof, and a link having eye connections to said float and rod.

7. In a gauge, the combination of a dial, a support therefor, an indicator operatively associated therewith, a rod carrying said indicator and guided for vertical movement, a tubular float housing depending from said support, a float disposed therein, said housing constituting a guide for said float while permitting limited lateral movement thereof, and a link connecting said float to said indicator rod.

8. In a gauge, the combination of a dial having a vertical guide, an indicator guided thereby, a rod carrying said indicator, guide members for said rod, a float housing, a float disposed in and guided by said housing, and a link connecting said float to said indicator rod.

9. In a gauge, the combination of a dial, an indicator coacting therewith, a rod carrying said indicator, guide members for said rod, a float, a float guiding means permitting limited lateral movement thereof, and a link connecting said float to said indicator rod.

10. In a gauge, the combination of a dial, a supporting shank for said dial, said shank being internally threaded, there being an unthreaded part below the threads, a tubular float housing threaded into said shank and having an unthreaded part coacting with the said unthreaded part of said shank to support said housing laterally, an indicator rod reciprocating through said shank, and a float disposed in said housing and connected to said rod.

11. A water gauge for auto radiators comprising a dial plate, an indicator coacting with said dial plate, a base on which said dial plate is mounted, a tubular float housing depending below said base, a baffle plate disposed in the upper end of said housing and having a relatively small central opening therein, a float within said housing, a rod carrying said indicator and disposed through said opening in said baffle plate whereby it is supported laterally, and a link connecting the lower end of said rod to said float.

12. A dial plate, an indicator movable in co-operative relation to the dial, a base adapted to be mounted on a liquid container a chambered neck carried by said base and supporting the dial plate, the chamber having small end openings and a lateral vent opening, a tube extending downwardly from the base and having its lower end adapted to communicate freely with the liquid in the container and having a small lateral aperture above the normal level of the liquid in the container, a float within the tube, and a connector comprising an upper section connected to the indicator and guided through the end openings of the neck chamber and a lower section flexibly jointed to the upper section and connected to the float.

13. A liquid gauge for auto radiators comprising a dial plate, an indicator registering on the dial plate and a hollow cylindrical element hanging in the liquid container, means loosely enclosed therein for actuating the indicator, means for connecting the actuating means with the indicator, and a base for said dial plate having an opening for the passage of said connecting means therethrough, said connecting means being composed of slender sections linked together to permit flexible and angular movement therebetween so that impulses may be efficiently effected in either direction between the actuator and the indicator and at any angle of thrust.

In witness whereof, I have hereunto set my hand.

LEWIS A. JARVIS.